(12) United States Patent
Koo

(10) Patent No.: US 7,870,414 B2
(45) Date of Patent: Jan. 11, 2011

(54) CLOCK TREE CIRCUIT AND SEMICONDUCTOR MEMORY DEVICE USING THE SAME, AND DUTY CYCLE CORRECTION METHOD

(75) Inventor: Cheul Hee Koo, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 1028 days.

(21) Appl. No.: 11/647,760

(22) Filed: Dec. 29, 2006

(65) Prior Publication Data
US 2008/0005606 A1 Jan. 3, 2008

(30) Foreign Application Priority Data
Jun. 30, 2006 (KR) .................. 10-2006-0061548

(51) Int. Cl.
*H03K 3/017* (2006.01)
(52) U.S. Cl. .................. 713/503; 713/500; 327/175
(58) Field of Classification Search .................. 713/503; 327/175
See application file for complete search history.

(56) References Cited

U.S. PATENT DOCUMENTS

| | | | | |
|---|---|---|---|---|
| 5,675,274 A | * | 10/1997 | Kobayashi et al. | 327/158 |
| 5,717,353 A | * | 2/1998 | Fujimoto | 327/276 |
| 7,116,149 B2 | * | 10/2006 | Kim | 327/175 |
| 7,123,540 B2 | * | 10/2006 | Byun | 365/194 |
| 7,285,996 B2 | * | 10/2007 | Fiedler | 327/158 |
| 7,307,461 B2 | * | 12/2007 | Nguyen et al. | 327/172 |
| 7,308,632 B1 | * | 12/2007 | Verma et al. | 714/731 |
| 7,671,646 B2 | * | 3/2010 | Cho et al. | 327/156 |
| 2003/0098730 A1 | * | 5/2003 | Miyazaki et al. | 327/158 |
| 2008/0157838 A1 | * | 7/2008 | Lee | 327/158 |
| 2008/0197903 A1 | * | 8/2008 | Humble | 327/175 |
| 2008/0204099 A1 | * | 8/2008 | Hur | 327/175 |

FOREIGN PATENT DOCUMENTS

KR 1020010047839 6/2001

* cited by examiner

*Primary Examiner*—Thomas Lee
*Assistant Examiner*—Zahid Choudhury
(74) *Attorney, Agent, or Firm*—Ladas & Parry LLP

(57) ABSTRACT

A semiconductor memory device, which includes a clock tree circuit for correcting the duty cycle of a clock. The device sets a beta ratio to cause a constant duty cycle by using a reference clock having a constant duty cycle in a test mode, and then applies the set beta ratio to a DLL clock outputted from a delay-locked loop. Then, when the duty cycle of the DLL clock, to which the beta ratio has been applied, is not constant, the duty cycle of the DLL clock is corrected in the delay-locked loop.

23 Claims, 4 Drawing Sheets

CLOCK TREE CIRCUIT AND SEMICONDUCTOR MEMORY DEVICE USING THE SAME, AND DUTY CYCLE CORRECTION METHOD

CROSS-REFERENCE TO RELATED APPLICATIONS

The present application claims priority to Korean patent application number 10-2006-0061548 filed on Jun. 30, 2006, which is incorporated herein by reference in its entirety.

BACKGROUND OF THE INVENTION

The present invention relates to a semiconductor memory device, and more particularly to a semiconductor memory device, which includes a clock tree circuit for correcting the duty cycle of a clock.

As is generally known in the art, a semiconductor memory device uses a delay-locked loop in order to compensate for a skew between an external clock and data, or between an external clock and an internal clock.

Also, in order to correct the duty cycle of a clock delay-locked in a delay-locked loop, a clock tree circuit as shown in FIG. 1 is used. The clock tree circuit has a construction as shown in FIG. 1, and is constituted between the delay-locked loop and a read data path, which includes a latch, an output buffer, etc.

Generally, a clock tree circuit 20 includes a plurality of inverters "INV1" which are serially connected. In addition, the clock tree circuit 20 includes multiple pairs of pull-up and pull-down elements "PM1" and "NM1", respectively, each pair of which is connected between the inverters "INV1" in order to correct the duty cycle of a clock, in which each of the pull-up and pull-down elements has a beta ratio based on a set state of a metal option 21.

According to the clock tree circuit 20 of FIG. 1, the duty cycle of a delay-locked loop (DLL) clock "DLL_CLK" outputted by the delay-locked loop 10 is corrected based on an initial set of a beta ratio, and then an output clock "CLK_OUT" is measured. Then, when it is determined as a result of the measurement that the duty cycle of the output clock has not been corrected to a ratio desired by the designer, the beta ratio is adjusted, and such measurement and adjustment are repeated, thereby correcting the duty cycle of the output clock "CLK_OUT".

However, such a conventional clock tree circuit has a problem in that it is impossible to determine whether a distortion in the duty cycle of a measured output clock "CLK_OUT" is caused by the delay-locked loop or by the clock tree circuit itself.

That is, the duty cycle of the clock "CLK_OUT" output from a clock tree circuit may be influenced by the delay-locked loop or by the beta ratio set in the clock tree circuit. A duty cycle distortion caused by the clock tree circuit can be corrected by adjusting the beta ratio of an internal inverter in the clock tree circuit. However, it is difficult to correct a duty cycle distortion caused by the delay-locked loop, and such a correction requires a lot of time and resources.

Additionally, since the conventional clock tree circuit adjusts a duty cycle by using a metal option, it takes a lot of time to correct a duty cycle, thereby delaying the time schedule for development thereof.

SUMMARY OF THE INVENTION

Accordingly, the present invention has been made to solve the above-mentioned and other problems occurring in the prior art. The present invention provides a solution to easily detect the cause of a distortion in a clock signal output from a duty correction circuit, when the clock signal output from a clock generation circuit such as a delay-locked loop has been corrected by the duty correction circuit.

The present invention also provides a clock tree circuit capable of easily correcting the duty cycle of a clock.

In order to accomplish these objects, a semiconductor memory device includes: a delay-locked loop for compensating for a skew between an external clock and an internal clock, and outputting a delay-locked loop (DLL) clock; an oscillation unit for providing a reference clock; a selection unit for selecting either the DLL clock or the reference clock according to a selection signal enabled in a test mode, and providing the selected clock as an input clock; and a clock tree circuit for adjusting the duty cycle ratio of the input clock.

Preferably, when the reference clock is input as the input clock, the clock tree circuit adjusts a beta ratio used for adjustment of the duty cycle so as to have a constant duty cycle; and when the DLL clock is input as the input clock, the clock tree circuit applies the adjusted beta ratio to the DLL clock and outputs the DLL clock, to which the adjusted beta ratio has been applied.

Preferably, the clock tree circuit includes: a control unit for receiving a test signal and outputting switching control signals in the test mode; and a clock tree unit for receiving the input clock and adjusting the duty cycle of the input clock based on the switching control signals.

Preferably, the control unit includes: a pull-up switching controller for receiving the test signal and outputting pull-up switching control signals to control a pull-up operation for duty cycle correction of the clock tree unit; and a pull-down switching controller for receiving the test signal and outputting pull-down switching control signals to control a pull-down operation for duty cycle correction of the clock tree unit.

Preferably, the pull-up switching controller includes: a first pulse generator for receiving the test signal and generating a first flip-flop input pulse, a first flip-flop clock pulse, a first set/reset pulse and a first shift register clock pulse; a first shift register section for entering a set state based on the first set/reset pulse, and shifting first output signals when the first shift register clock pulse occurs; and a first flip-flop section for entering a set state based on the first set/reset pulse, and receiving the first flip-flop input pulse and sequentially enabling the pull-up switching control signals when the first flip-flop clock pulse occurs and simultaneously the first output signals are sequentially inputted.

Preferably, the first shift register section includes: a first D flip-flop which includes a set terminal to receive the first set/reset pulse, a clock terminal to receive the first shift register clock pulse, an input terminal connected to an output terminal of a last-stage D flip-flop, and an output terminal connected to an input terminal of a next-stage D flip-flop; and a plurality of second D flip-flops each of which includes a reset terminal to receive the first set/reset pulse, a clock terminal to receive the first shift register clock pulse, an input terminal connected to an output terminal of a previous-stage D flip-flop, and an output terminal connected to an input terminal of a next-stage D flip-flop.

Preferably, the first flip-flop section includes: a plurality of third D flip-flops, wherein each third D flip-flop includes a set terminal to receive the first set/reset pulse; a clock terminal to receive a signal obtained by performing an AND operation with respect to the first flip-flop clock pulse and a corresponding first output signal; an input terminal to receive the first flip-flop input pulse; and an output terminal to output a corresponding pull-up switching control signal.

Preferably, the pull-down switching controller includes: a second pulse generator for receiving the test signal and generating a second flip-flop input pulse, a second flip-flop clock pulse, a second set/reset pulse and a second shift register clock pulse; a second shift register section for entering a set state based on the second set/reset pulse, and shifting second output signals when the second shift register clock pulse occurs; and a second flip-flop section for entering a reset state based on the second set/reset pulse, and receiving the second flip-flop input pulse and sequentially enabling the pull-down switching control signals when the second flip-flop clock pulse occurs and simultaneously the second output signals are sequentially inputted.

Preferably, the second shift register section includes: a fourth D flip-flop which includes a set terminal to receive the second set/reset pulse, a clock terminal to receive the second shift register clock pulse, an input terminal connected to an output terminal of a last-stage D flip-flop, and an output terminal connected to an input terminal of a next-stage D flip-flop; and a plurality of fifth D flip-flops each of which includes a reset terminal to receive the second set/reset pulse, a clock terminal to receive the second shift register clock pulse, an input terminal connected to an output terminal of a previous-stage D flip-flop, and an output terminal connected to an input terminal of a next-stage D flip-flop.

Preferably, the second flip-flop section includes: a plurality of sixth D flip-flops, in which each sixth D flip-flop includes a reset terminal to receive the second set/reset pulse; a clock terminal to receive a signal obtained by performing an AND operation with respect to the second flip-flop clock pulse and a corresponding second output signal; an input terminal to receive the second flip-flop input pulse; and an output terminal to output a corresponding pull-down switching control signal.

Preferably, the clock tree unit includes: a switching means for performing a switching operation according to the switching control signal; a pull-up means for pulling up an electric potential of the input clock according to a state of the switching means; and a pull-down means for pulling down an electric potential of the input clock according to a state of the switching means.

Preferably, the switching means includes: a PMOS transistor-type switching element for controlling a pull-up operation of the pull-up means by performing a switching operation according to the switching control signal; and an NMOS transistor-type switching element for controlling a pull-down operation of the pull-down means by performing a switching operation according to the switching control signal.

Preferably, the pull-up means includes: a PMOS transistor-type pull-up element, which is turned on based on a state of the input clock so as to pull up an electric potential of the input clock; and the pull-down means includes an NMOS transistor-type pull-down element, which is turned on based on a state of the input clock so as to pull down an electric potential of the input clock.

Preferably, the oscillation unit includes a ring oscillator structure.

Preferably, the selection unit provides the reference clock as the input clock when the selection signal is enabled, and provides the DLL clock as the input clock when the selection signal is disabled.

Preferably, the selection unit includes: a first NAND gate for performing an NAND operation with respect to the DLL clock and the selection signal; an inverter for inverting the selection signal; a second NAND gate for performing an NAND operation with respect to a signal inverted by the inverter and the reference clock; and a third NAND gate for performing an NAND operation with respect to a signal obtained through the NAND operation of the first NAND gate and a signal obtained through the NAND operation of the second NAND gate.

In accordance with another aspect of the present invention, a clock tree circuit is provided for correcting a duty cycle of a predetermined clock, the clock tree circuit includes: a control unit for outputting switching control signals for the correction of the duty cycle according to a test signal set in the test mode; and a clock tree unit for receiving the predetermined clock and adjusting the duty cycle of the predetermined clock according to the switching control signals.

Preferably, the control unit outputs the switching control signals by setting a beta ratio for the correction of the duty ratio according to the test signal set to correspond to the reference clock.

Preferably, the control unit includes: a pull-up switching controller for receiving the test signal and outputting pull-up switching control signals to control a pull-up operation for duty cycle correction of the clock tree unit; and a pull-down switching controller for receiving the test signal and outputting pull-down switching control signals to control a pull-down operation for duty cycle correction of the clock tree unit.

Preferably, the pull-up switching controller includes: a first pulse generator for receiving the test signal and generating a first flip-flop input pulse, a first flip-flop clock pulse, a first set/reset pulse and a first shift register clock pulse; a first shift register section for entering a set state based on the first set/reset pulse, and shifting first output signals when the first shift register clock pulse occurs; and a first flip-flop section for entering a set state based on the first set/reset pulse, and receiving the first flip-flop input pulse and sequentially enabling the pull-up switching control signals when the first flip-flop clock pulse occurs and simultaneously the first output signals are sequentially inputted.

Preferably, the pull-down switching controller includes: a second pulse generator for receiving the test signal and generating a second flip-flop input pulse, a second flip-flop clock pulse, a second set/reset pulse and a second shift register clock pulse; a second shift register section for entering a set state based on the second set/reset pulse, and shifting second output signals when the second shift register clock pulse occurs; and a second flip-flop section for entering a reset state based on the second set/reset pulse, and receiving the second flip-flop input pulse and sequentially enabling the pull-down switching control signals when the second flip-flop clock pulse occurs and simultaneously the second output signals are sequentially inputted.

Preferably, the clock tree unit includes: a plurality of switching means for performing switching operations according to the switching control signals; a plurality of pull-up means for pulling up an electric potential of the input clock according to states of the switching means; and a plurality of pull-down means for pulling down an electric potential of the input clock according to states of the switching means.

In accordance with another aspect of the present invention, a method is provided for duty cycle correction that includes the steps of: providing a delay-locked loop (DLL) clock by locking an external clock to a rising edge of an internal clock; correcting a duty cycle of the DLL clock; generating a reference clock having a constant duty cycle; setting a beta ratio for adjustment of a duty cycle by using the reference clock in a test mode; applying the set beta ratio to the DLL clock, and providing the DLL clock, to which the set beta ratio has been applied, as an output clock; and correcting the duty cycle of the DLL clock again according to the output clock.

Preferably, when the duty cycle is not constant, the duty cycle of the DLL clock is corrected using a delay-locked loop.

BRIEF DESCRIPTION OF THE DRAWINGS

The objects, features and advantages of the present invention will be more apparent from the following detailed description taken in conjunction with the accompanying drawings, in which.

DETAILED DESCRIPTION OF THE PREFERRED EMBODIMENTS

Figure 1:
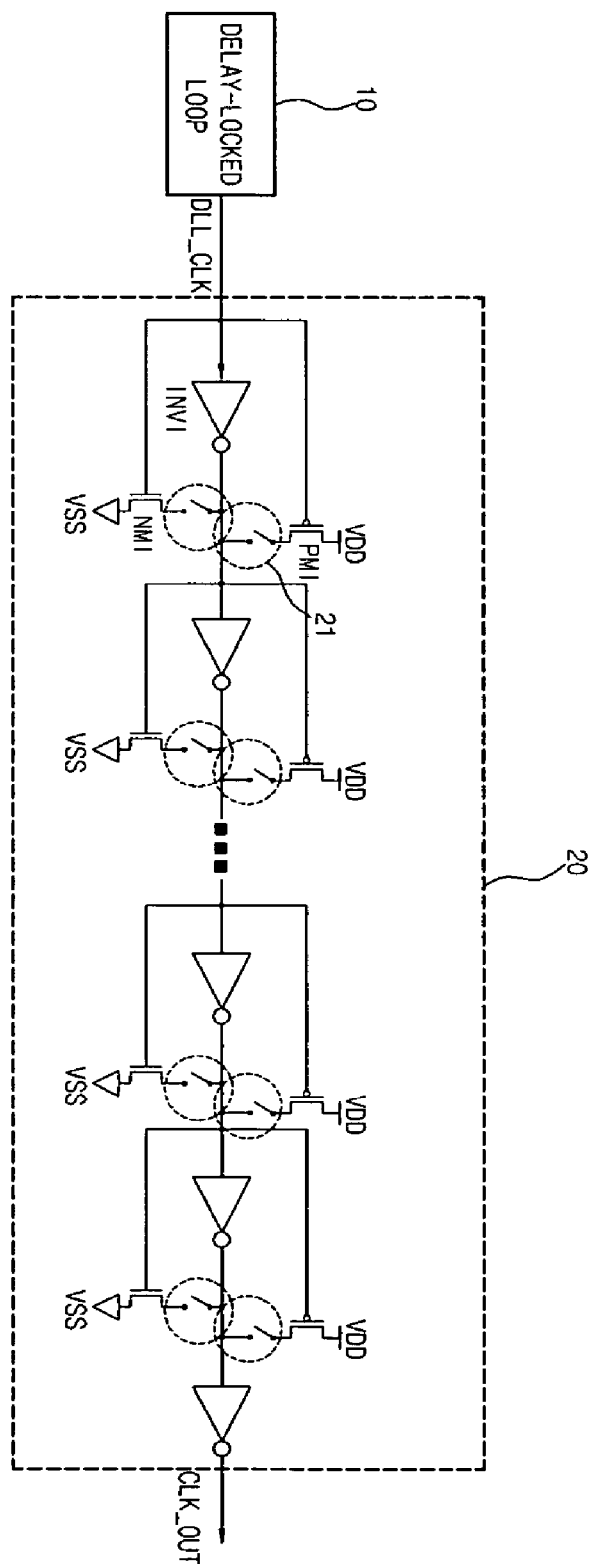
FIG. 1 is a circuit diagram illustrating the construction of the conventional delay-locked loop (10) and clock tree circuit (20)

Hereinafter, preferred embodiments of the present invention will be described with reference to the accompanying drawings. In the following description and drawings, the same reference numerals are used to designate the same or similar components, and so repetition of the description on the same or similar components will be omitted.

The present invention employs an oscillation circuit to provide a clock signal having a constant duty cycle, in order to easily discriminate between a duty cycle distortion caused by a clock generation circuit and a duty cycle distortion caused by a duty correction circuit when the duty cycle of a clock signal outputted from the clock generation circuit has been corrected in the duty correction circuit. According to an embodiment of the present invention, clock signals outputted from the clock generation circuit and the oscillation circuit, respectively, are corrected in the duty correction circuit, and then the duty cycle difference between the corrected clock signals is determined, so that it is possible to determine whether a distortion in the duty cycle of a clock signal, which has been provided from the clock generation circuit and outputted through the duty correction circuit, is caused by the clock generation circuit or by the duty correction circuit.

In an embodiment of the present invention, a delay-locked loop is used as the clock generation circuit, and a clock tree circuit is used as the duty correction circuit. Particularly, the clock tree circuit according to the present invention is constructed such that a duty cycle can be easily corrected by setting the beta ratio of an internal inverter in a test mode, without using a metal option.

Figure 2:
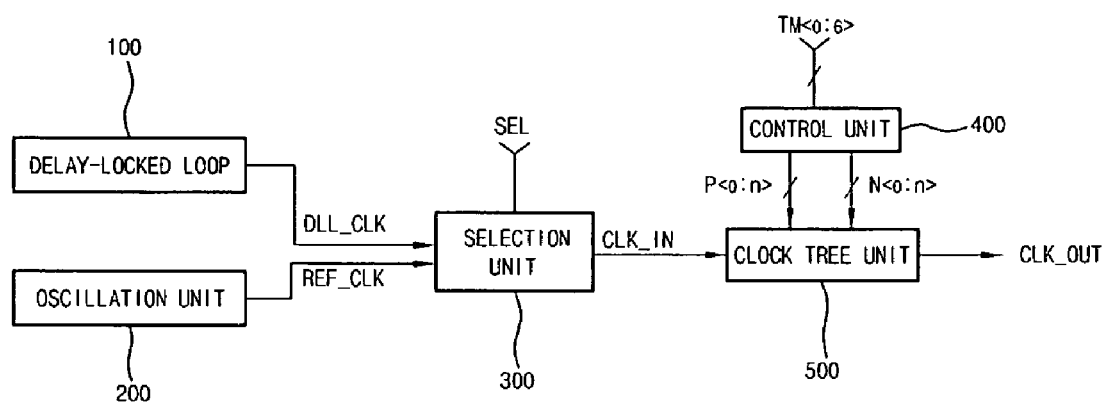
FIG. 2 is a block diagram illustrating the construction of a semiconductor memory device using a clock tree circuit according to an embodiment of the present invention.

According to an embodiment of the present invention shown in FIG. 2, in a test mode, a beta ratio is set to have a constant duty cycle by using a reference clock "REF_CLK" having a constant duty cycle, and then the set beta ratio is applied to a delay-locked loop (DLL) clock "DLL_CLK" outputted from a delay-locked loop 100. Then, when the duty cycle of the DLL clock "DLL_CLK", to which the beta ratio has been applied, is not a constant value, the duty cycle of the DLL clock "DLL_CLK" is corrected in the delay-locked loop 100.

In detail, the semiconductor memory device of FIG. 2 includes the delay-locked loop 100, an oscillation unit 200, a selection unit 300, a control unit 400 and a clock tree unit 500. The delay-locked loop 100 delay-locks an external clock in accordance with the phase of an internal clock, thereby outputting a DLL clock "DLL_CLK". The oscillation unit 200 creates a reference clock "REF_CLK" having a constant duty cycle. The selection unit 300 selects either the DLL clock "DLL_CLK" or the reference clock "REF_CLK" according to a selection signal "SEL" enabled in a test mode, and provides the selected clock as an input clock "CLK_IN". The control unit 400 receives a plurality of test signals TM<0:6> provided in the test mode, and outputs a plurality of switching control signals P<0:n> and N<0:n> corresponding to a beta ratio. The clock tree unit 500 adjusts the duty cycle of the input clock "CLK_IN" according to the switching control signals P<0:n> and N<0:n>, and outputs the adjusted input clock "CLK_IN" as an output clock "CLK_OUT".

The delay-locked loop 100 outputs the external clock, as a DLL clock "DLL_CLK" is lined up with the rising edge of an internal clock, in order to compensate for a skew either between the external clock and data, or between the external clock and the internal clock. In this case, the delay-locked loop 100 may include a duty cycle correction circuit for correcting the duty cycle, and a well-known circuit may be used as the delay-locked loop 100.

The oscillation unit 200 creates a reference clock "REF_CLK" having a constant duty cycle, that is, a duty cycle of 1:1. Herein, the oscillation unit 200 may have the same construction as a ring oscillator, which can always output a clock having a constant duty cycle regardless of PVT (i.e., Process, Voltage and Temperature). Such a ring oscillator may use a well-known circuit.

Figure 3:
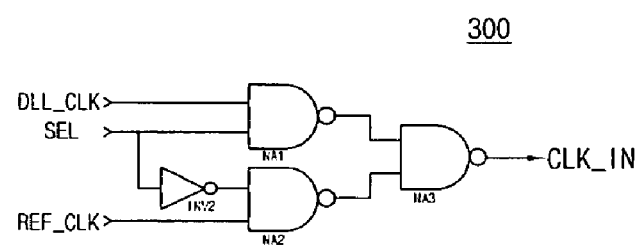
FIG. 3 is a circuit diagram illustrating an embodiment of the selection unit (300) shown in FIG. 2.

The selection unit 300 selects either the DLL clock "DLL_CLK" or the reference clock "REF_CLK" according to a selection signal "SEL" enabled in a test mode, and provides the selected clock as an input clock "CLK_IN", in which the selection unit 300 may be constructed as shown in FIG. 3.

That is, as shown in FIG. 3, the selection unit 300 may include a first NAND gate NA1 for performing a NAND operation with respect to a DLL clock "DLL_CLK" and a selection signal "SEL", an inverter INV2 for inverting the selection signal "SEL", a second NAND gate NA2 for performing a NAND operation with respect to a signal inverted by the inverter INV2 and a reference clock "REF_CLK", and a third NAND gate NA3 for outputting an input clock "CLK_IN" by performing a NAND operation with respect to the output signal of the first NAND gate NA1 and the output signal of the second NAND gate NA2.

The selection unit 300 outputs the reference clock "REF_CLK" as the input clock "CLK_IN" when the selection signal "SEL" is enabled, outputs the DLL clock "DLL_CLK" as the input clock "CLK_IN" when the selection signal "SEL" is disabled.

Figure 4:
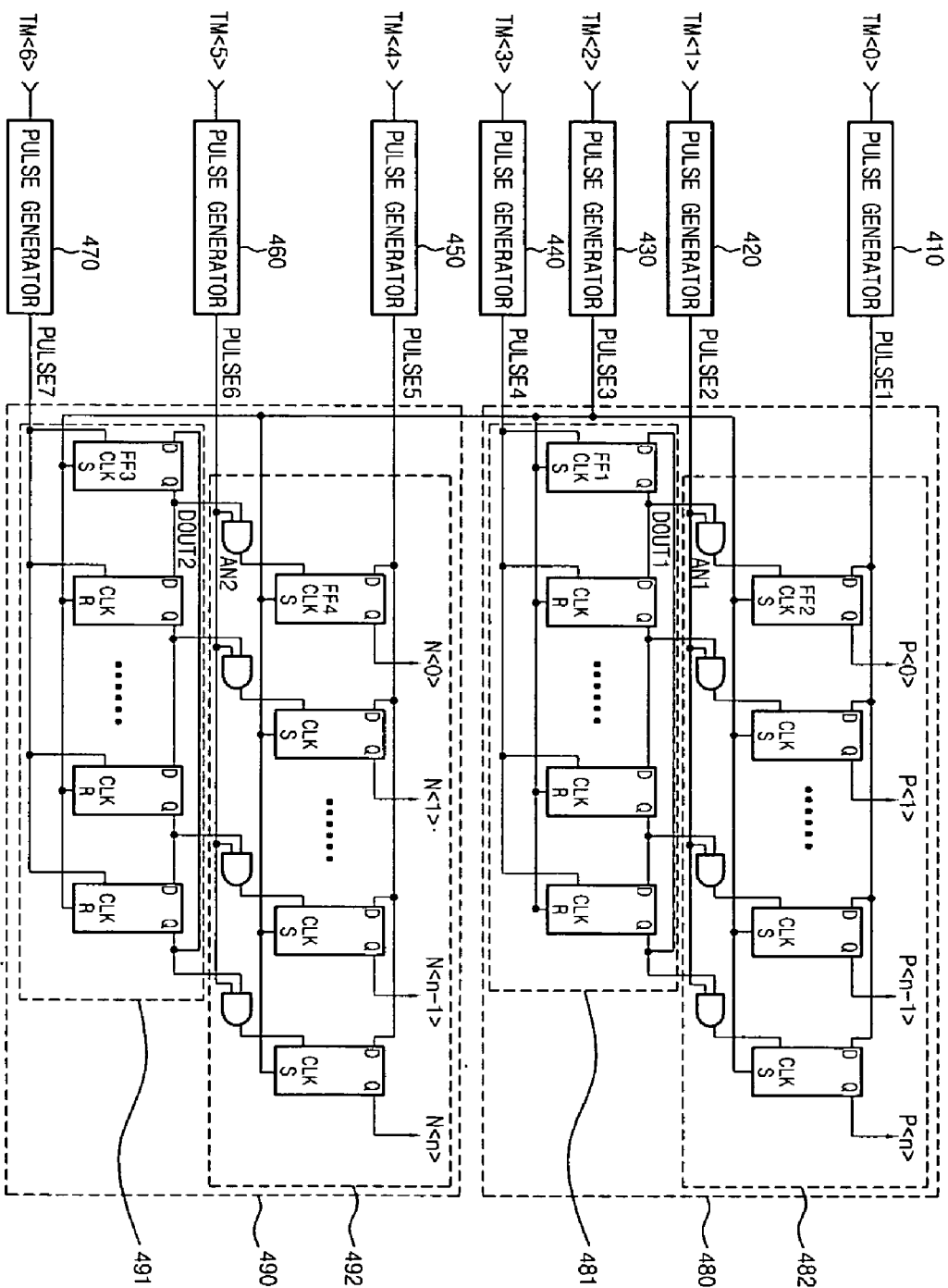
FIG. 4 is a circuit diagram illustrating an embodiment of the control unit (400) shown in FIG. 2.

As shown in FIG. 4, the control unit 400 sets a beta ratio according to a plurality of test signals TM<0:6> inputted in a test mode, and outputs a plurality of switching control signals P<0:n> and N<0:n> corresponding to the beta ratio. The control unit 400 may include a plurality of pulse generators 410 to 470, a pull-up switching controller 480 and a pull-down switching controller 490, which will now be described in detail.

The pulse generators 410 to 470 receive the test signals TM<0:6>, respectively, and generate pulses PULSE1 to PULSE7, respectively, to be inputted to the terminals of D flip-flops FF1 to FF4, which will be described later.

The pull-up switching controller 480 includes a shift register section 481 and a flip-flop section 482. The shift register section 481 enters a set state by the third pulse PULSE3, and shifts an output signal DOUT1 when the fourth pulse PULSE4 occurs. The flip-flop section 482 enters a set state by the third pulse PULSE3, and sequentially outputs a plurality of switching control signals P<0:n> corresponding to shift stages, respectively, based on pulses obtained by performing an AND operation with respect to the second pulse PULSE2 and the output signal DOUT1 of the first-stage flip-flop FF1, and with respect to the second pulse PULSE2 and each of the consecutive shift register signals following the output signal DOUT1 in the shift register section 481.

Herein, the shift register section 481 may include a plurality of D flip-flops FF1, in which the fourth pulse PULSE4 is inputted in common to the clock terminals CLK of the D flip-flops FF1. Also, the input terminal D of each D flip-flop FF1 is connected to the output terminal Q of the previous-stage D flip-flop FF1, and the input terminal D of the first-stage D flip-flop FF1 is connected to the output terminal Q of the last-stage D flip-flop FF1. In addition, the first-stage D flip-flop FF1 receives the third pulse PULSE3 through the set terminal S thereof, and the other D flip-flops FF1 receive the third pulse PULSE3 through the reset terminals R thereof.

In the shift register section 481 having such a construction, the third pulse PULSE3 initializes the first-stage D flip-flop FF1 to a high level, and initializes the rest of D flip-flops FF1 to a low level.

Thereafter, each next-stage D flip-flop FF1 shifts and outputs the output signal of the previous-stage D flip-flop FF1 whenever the fourth pulse PULSE4 occurs.

The flip-flop section 482 may include a plurality of D flip-flop FF2 and a plurality of AND gates AN1. Herein, one D flip-flop FF2 and one AND gate AN1 form a unit stage. In detail, each AND gate AN1 performs an AND operation with respect to the second pulse PULSE2 and a corresponding output signal of the shift register section 481, and provides the resultant output signal to the clock terminal CLK of the corresponding D flip-flop FF2 which is included in a stage with the corresponding AND gate AN1. In addition, the first pulse PULSE1 is inputted to the input terminal D of each D flip-flop FF2, and the third pulse PULSE3 is inputted to the set terminal S of each D flip-flop FF2.

The flip-flop section 482 having such a construction enters a set state when the third pulse PULSE3 occurs, and it is determined based on the state of the first pulse PULSE1 whether or not each of the switching control signals P<0:n> is enabled while the output signal of the AND gate AN1 in each stage is being enabled.

The pull-down switching controller 490 includes a shift register section 491 and a flip-flop section 492. The shift register section 491 enters a set state by the third pulse PULSE3, and shifts an output signal DOUT2 when the seventh pulse PULSE7 occurs. The flip-flop section 492 enters a reset state by the third pulse PULSE3, and sequentially outputs a plurality of switching control signals N<0:n> corresponding to shift stages, respectively, based on pulses obtained by performing an AND operation with respect to the sixth pulse PULSE6 and the output signal DOUT2 of the first-stage flip-flop FF3, and with respect to the second pulse PULSE2 and each of the consecutive shift signals following the output signal DOUT2 in the shift register section 491.

Herein, the shift register section 491 may include a plurality of D flip-flops FF3, and has the same construction as that of the shift register section 481 of the pull-up switching controller 480, except that the seventh pulse PULSE7 is inputted to the clock terminal CLK of each D flip-flop FF3, so a detailed description of the construction and operation thereof will be omitted to avoid redundancy.

The flip-flop section 492 may include a plurality of D flip-flop FF4 and a plurality of AND gates AN2. Herein, one D flip-flop FF4 and one AND gate AN2 form a unit stage. Each AND gate AN2 performs an AND operation with respect to the fifth pulse PULSE5 and the output signal DOUT2 of each corresponding D flip-flop FF3, and provides the resultant output signal to the clock terminal CLK of the corresponding D flip-flop FF4 which is included in a stage with the corresponding AND gate AN2. In addition, the fifth pulse PULSE5 is inputted to the input terminal D of each D flip-flop FF4, and the third pulse PULSE3 is inputted to the reset terminal R of each D flip-flop FF4.

The flip-flop section 492 having such a construction enters a set state when the third pulse PULSE3 occurs, and it is determined based on the state of the fifth pulse PULSE5 whether or not each of the switching control signals N<0:n> is enabled while the output signal of the AND gate AN2 in each corresponding stage is being enabled.

As described above, in a test mode, the control unit 400 receives a plurality of test signals TM<9:6> having various set values and outputs a plurality of switching control signals P<n:n> and N<n:n> for respectively controlling PMOS transistor-type switching elements PM3 and NMOS transistor-type switching elements NM2 in the clock tree unit 500, so as to adjust the beta ratio of each inverter in the clock tree unit 500, which will now be described.

The clock tree unit 500 adjusts the duty cycle of the input clock "CLK_IN" based on the switching control signals P<0:n> and N<0:n>, and outputs the adjusted input clock "CLK_IN" as an output clock "CLK_OUT". The clock tree unit 500 may be constructed as the circuit shown in FIG. 5.

Figure 5:
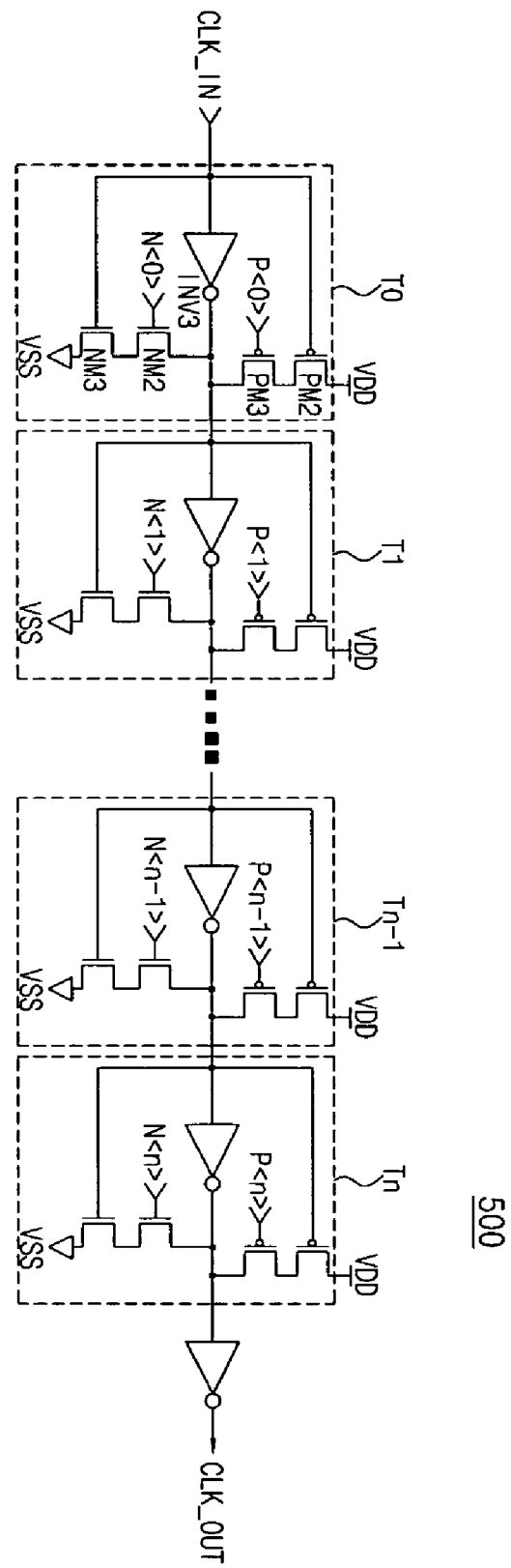
FIG. 5 is a circuit diagram illustrating an example of the clock tree unit (500) shown in FIG. 2.

That is, the clock tree unit 500 of FIG. 5 includes a construction of a plurality of tree sections T0, T1, ..., Tn-1 and Tn, which are connected in the shape of a serial chain. Each tree section may include an inverter INV3, in which inverters INV3 included in tree sections are serially connected. In addition, each tree section may include a PMOS transistor-type pull-up element PM2 and a PMOS transistor-type switching element PM3, which are serially connected to pull up the output of the inverter INV3 to a power supply voltage VDD; and an NMOS transistor-type switching element NM2 and an NMOS transistor-type pull-down element NM3, which are serially connected to pull down the output of the inverter INV3 to a ground voltage VSS.

Herein, the input clock of each tree section (e.g., tree section T0) is applied to the gates of the PMOS transistor-type pull-up element PM2 and NMOS transistor-type pull-down element NM3 in the corresponding tree section (e.g., tree section T0). In addition, the switching control signals P<0:n> and N<0:n> are inputted to the gates of the PMOS transistor-type switching elements PM3 and NMOS transistor-type switching elements NM2, respectively.

According to the clock tree unit 500 having such a construction, the PMOS transistor-type pull-up element PM2 and NMOS transistor-type pull-down element NM3 in each tree section T0, T1, ..., Tn-1 and Tn are selectively turned on based on the state of the input clock "CLK_IN", so as to perform a pull-up or pull-down operation.

In addition, such a pull-up or pull-down operation is performed based on whether the PMOS transistor-type switching element PM3 and NMOS transistor-type switching element NM2 controlled by the switching control signals P<0:n> and N<0:n> are turned on or off.

That is, the clock tree unit 500 determines the beta ratio of each tree section T0, T1, ..., Tn-1 and Tn, by selectively performing the pull-up or pull-down operation of the PMOS transistor-type pull-up element PM2 or NMOS transistor-type pull-down element NM3 based on the switching control signals P<0:n> and N<0:n>, thereby adjusting the duty cycle of the input clock "CLK_IN" according to the determined beta ratio.

Hereinafter, the operation of the semiconductor memory device according to an embodiment of the present invention will be described in detail with reference to FIGS. 2 to 5.

First, when a test mode starts, the selection signal "SEL" is enabled, so that a reference clock "REF_CLK" is selected between a DLL clock "DLL_CLK" outputted from the delay-locked loop 100 and the reference clock "REF_CLK" created by the oscillation unit 200, and is provided to the clock tree unit 500.

Then, the clock tree unit 500 adjusts the duty cycle of the reference clock "REF_CLK" based on a preset beta ratio and outputs the adjusted reference clock "REF_CLK" as an output clock "CLK_OUT". When the output clock "CLK_OUT" is measured and it is determined as a result of the measurement that the output clock "CLK_OUT" does not have a duty cycle of 1:1, the beta ratio is adjusted so that the output clock "CLK_OUT" can have a duty cycle of 1:1. In this case, the beta ratio may be controlled by means of a plurality of test signals TM<0:6> which are inputted to the control unit 400.

After the beta ratio is adjusted so that the output clock "CLK_OUT" can have the duty cycle of 1:1, the selection signal "SEL" is disabled, so that the DLL clock "DLL_CLK" outputted from the delay-locked loop 100 is selected and provided to the clock tree unit 500. Then, the clock tree unit 500 adjusts a duty cycle of the DLL clock "DLL_CLK" based on the last-set beta ratio and outputs the adjusted DLL clock "DLL_CLK" as an output clock "CLK_OUT".

In this case, if the output clock "CLK_OUT" does not have a duty cycle of 1:1, this means that a distortion in the duty cycle of the output clock "CLK_OUT" was caused by the delay-locked loop 100. Then, according to an embodiment of the present invention, the duty cycle of the DLL clock "DLL_CLK" is adjusted in the delay-locked loop 100 and the adjusted DLL clock "DLL_CLK" is provided to the clock tree unit 500, so that it is possible to provide the DLL clock "DLL_CLK" to a read path without a separate duty adjustment in the clock tree unit 500.

That is, according to an embodiment of the present invention, either the DLL clock "DLL_CLK" outputted from the delay-locked loop 100 or the reference clock "REF_CLK" having a constant duty cycle, which is created by the oscillation unit 200, is selected and provided to the clock tree unit 500 in a test mode, and a beta ratio is set as a constant value, so that it is possible to determine whether a distortion in the duty cycle of the output clock "CLK_OUT" of the clock tree unit 500 has been caused by the delay-locked loop 100 or by the clock tree unit 500.

Therefore, according to an embodiment of the present invention, the duty cycle of the DLL clock "DLL_CLK" in the delay-locked loop 100 is adjusted when it is determined that a distortion in the duty cycle of a clock has been caused by the delay-locked loop 100, and the duty cycle of the input clock "CLK_IN" in the clock tree unit 500 is adjusted when it is determined that a distortion in the duty cycle of a clock has been caused by the clock tree unit 500. Therefore, according to an embodiment of the present invention, it is possible to correct the duty cycle of the input clock "CLK_IN" without several trial-and-error attempts.

In addition, according to an embodiment of the present invention, in a test mode, the duty cycle of the input clock "CLK_IN" is corrected based on a beta ratio set in the control unit 400, thereby reducing the time period for correction of a duty cycle.

As described above, according to the present invention, it is determined by means of a clock having a constant duty cycle whether a distortion in the duty cycle of a clock output from the clock tree unit 500 has been caused by the delay-locked loop 100 or by the clock tree unit 500 in a test mode, and then the duty cycle of the clock in a corresponding circuit is adjusted. Accordingly, it is possible to correct the duty cycle of a DLL clock and to provide the corrected DLL clock to a read path, without several trial-and-error attempts.

In addition, according to an embodiment of the present invention, a metal option is not used, and the duty cycle of a clock inputted in a test mode is adjusted, so that it is possible to reduce the time period for correction of a duty cycle, thereby reducing the time required for development of a new product.

Although a preferred embodiments of the present invention have been described for illustrative purposes, those skilled in the art will appreciate that various modifications, additions and substitutions are possible, without departing from the scope and spirit of the invention as set forth in the accompanying claims.

What is claimed is:

1. A semiconductor memory device comprising:
    a delay-locked loop (DLL) for compensating for a skew between an external clock and an internal clock, and outputting a delay-locked loop (DLL) clock;
    an oscillation unit for providing a reference clock;
    a selection unit for selecting either the DLL clock or the reference clock according to a selection signal enabled in a test mode, and providing a selected clock as an input clock; and
    a clock tree circuit for adjusting a duty cycle of the input clock,
    wherein when the reference clock is input as the input clock by the selection unit, the clock tree circuit adjusts a duty cycle of the reference clock by an adjustment ratio set such that the reference clock output by the clock tree circuit has a predetermined duty cycle,
    when the DLL clock is input as the input clock by the selection unit, the clock tree circuit adjusts a duty cycle of the DLL clock by applying the adjustment ratio to the DLL clock, and
    when the DLL clock is input as the input clock by the selection unit, and the DLL clock output by the clock tree circuit does not have the predetermined duty cycle, the DLL adjusts the duty cycle of the DLL clock.

2. The semiconductor memory device as claimed in claim 1, wherein when the reference clock is input as the input clock;
    the clock tree circuit adjusts a beta ratio used for adjustment of the duty cycle of the input clock so as for the input clock to have the predetermined duty cycle; and
    when the DLL clock is inputted as the input clock, the clock tree circuit applies an adjusted beta ratio to the DLL clock and outputs the DLL clock, to which the adjusted beta ratio has been applied.

3. The semiconductor memory device as claimed in claim 1, wherein the clock tree circuit comprises:
    a control unit for receiving a test signal and outputting switching control signals in the test mode; and
    a clock tree unit for receiving the input clock and adjusting the duty cycle of the input clock based on the switching control signals.

4. The semiconductor memory device as claimed in claim 3, wherein the control unit comprises:
a pull-up switching controller for receiving the test signal and outputting pull-up switching control signals to control a pull-up operation for duty cycle correction of the clock tree unit; and
a pull-down switching controller for receiving the test signal and outputting pull-down switching control signals to control a pull-down operation for duty cycle correction of the clock tree unit.

5. The semiconductor memory device as claimed in claim 4, wherein the pull-up switching controller comprises:
a first pulse generator for receiving the test signal and generating a first flip-flop input pulse, a first flip-flop clock pulse, a first set/reset pulse and a first shift register clock pulse;
a first shift register section for entering a set state based on the first set/reset pulse, and shifting first output signals when the first shift register clock pulse occurs; and
a first flip-flop section for entering a set state based on the first set/reset pulse, and receiving the first flip-flop input pulse and sequentially enabling the pull-up switching control signals when the first flip-flop clock pulse occurs and simultaneously the first output signals are sequentially inputted.

6. The semiconductor memory device as claimed in claim 5, wherein the first shift register section comprises:
a first D flip-flop which includes a first set terminal to receive the first set/reset pulse, a first clock terminal to receive the first shift register clock pulse, a first input terminal connected to an output terminal of a last-stage D flip-flop, and a first output terminal connected to an input terminal of a next-stage D flip-flop; and
a plurality of second D flip-flops each of which includes a reset terminal to receive the first set/reset pulse, a second clock terminal to receive the first shift register clock pulse, a second input terminal connected to an output terminal of a previous-stage D flip-flop, and a second output terminal connected to an input terminal of a next-stage D flip-flop.

7. The semiconductor memory device as claimed in claim 5, wherein the first flip-flop section comprises a plurality of third D flip-flops,
wherein each third D flip-flop includes a third set terminal to receive the first set/reset pulse, a third clock terminal to receive a signal obtained by performing an AND operation with respect to the first flip-flop clock pulse and a corresponding first output signal, a third input terminal to receive the first flip-flop input pulse, and an output terminal to a third output a corresponding pull-up switching control signal.

8. The semiconductor memory device as claimed in claim 4, wherein the pull-down switching controller comprises:
a second pulse generator for receiving the test signal and generating a second flip-flop input pulse, a second flip-flop clock pulse, a second set/reset pulse and a second shift register clock pulse;
a second shift register section for entering a set state based on the second set/reset pulse, and shifting second output signals when the second shift register clock pulse occurs; and
a second flip-flop section for entering a reset state based on the second set/reset pulse, and receiving the second flip-flop input pulse and sequentially enabling the pull-down switching control signals when the second flip-flop clock pulse occurs and simultaneously the second output signals are sequentially inputted.

9. The semiconductor memory device as claimed in claim 8, wherein the second shift register section comprises:
a fourth D flip-flop which includes a fourth set terminal to receive the second set/reset pulse, a fourth clock terminal to receive the second shift register clock pulse, a fourth input terminal connected to the second output terminal of a last-stage D flip-flop, and a fourth output terminal connected to an input terminal of a next-stage D flip-flop; and
a plurality of fifth D flip-flops each of which includes a reset terminal to receive the second set/reset pulse, a fifth clock terminal to receive the second shift register clock pulse, an input terminal connected to the fourth output terminal of a previous-stage D flip-flop, and a fifth output terminal connected to an input terminal of a next-stage D flip-flop.

10. The semiconductor memory device as claimed in claim 8, wherein the second flip-flop section comprises a plurality of sixth D flip-flops,
wherein each sixth D flip-flop includes a reset terminal to receive the second set/reset pulse, a sixth clock terminal to receive a signal obtained by performing an AND operation with respect to the second flip-flop clock pulse and a corresponding second output signal, a sixth input terminal to receive the second flip-flop input pulse, and a sixth output terminal to output a corresponding pull-down switching control signal.

11. The semiconductor memory device as claimed in claim 3, wherein the clock tree unit comprises:
a switching means for performing a switching operation according to the switching control signal;
a pull-up means for pulling up an electric potential of the input clock according to a state of the switching means; and
a pull-down means for pulling down an electric potential of the input clock according to the state of the switching means.

12. The semiconductor memory device as claimed in claim 11, wherein the switching means comprises:
a PMOS transistor-type switching element for controlling a pull-up operation of the pull-up means by performing a switching operation according to the switching control signal; and
an NMOS transistor-type switching element for controlling a pull-down operation of the pull-down means by performing a switching operation according to the switching control signal.

13. The semiconductor memory device as claimed in claim 11, wherein the pull-up means includes a PMOS transistor-type pull-up element, which is turned on based on a state of the input clock so as to pull up an electric potential of the input clock, and
the pull-down means includes an NMOS transistor-type pull-down element, which is turned on based on a state of the input clock so as to pull down an electric potential of the input clock.

14. The semiconductor memory device as claimed in claim 1, wherein the oscillation unit includes a ring oscillator structure.

15. The semiconductor memory device as claimed in claim 1, wherein the selection unit provides the reference clock as the input clock when the selection signal is enabled, and provides the DLL clock as the input clock when the selection signal is disabled.

16. The semiconductor memory device as claimed in claim 15, wherein the selection unit comprises:

a first NAND gate for performing a first NAND operation with respect to the DLL clock and the selection signal;
an inverter for inverting the selection signal;
a second NAND gate for performing a second NAND operation with respect to a signal inverted by the inverter and the reference clock; and
a third NAND gate for performing a third NAND operation with respect to a signal obtained through the first NAND operation of the first NAND gate and a signal obtained through the second NAND operation of the second NAND gate.

17. A semiconductor memory device, comprising:
a delay-locked loop (DLL) for compensating for a skew between an external clock and an internal clock, and outputting a delay-locked loop (DLL) clock: and
a clock tree circuit for inputting the DLL clock or a reference clock as an input clock, adjusting a duty cycle of the input clock and outputting the adjusted input clock as an output clock,
wherein when the reference clock is input as the input clock, the clock tree circuit adjusts a duty cycle of the reference clock by an adjustment ratio set such that the reference clock output by the clock tree circuit has a predetermined duty cycle,
when the DLL clock is input as the input clock, the clock tree circuit adjusts a duty cycle of the DLL clock by applying the adjustment ratio to the DLL clock, and
when the DLL clock is input as the input clock, and the DLL clock having passed through the clock tree circuit does not have the predetermined duty cycle, the DLL adjusts the duty cycle of the DLL clock.

18. The semiconductor memory device as claimed in claim 17, wherein the clock tree circuit comprises:
a control unit for outputting switching control signals to adjust the duty cycle of the input clock according to a test signal set in the test mode; and
a clock tree unit for receiving the input clock and adjusting the duty cycle of the input clock according to the switching control signals.

19. The semiconductor memory device as claimed in claim 18, wherein the control unit comprises:
a pull-up switching controller for receiving the test signal and outputting pull-up switching control signals to control a pull-up operation for duty cycle correction of the clock tree unit; and
a pull-down switching controller for receiving the test signal and outputting pull-down switching control signals to control a pull-down operation for duty cycle correction of the clock tree unit.

20. The semiconductor memory device as claimed in claim 19, wherein the pull-up switching controller comprises:
a first pulse generator for receiving the test signal and generating a first flip-flop input pulse, a first flip-flop clock pulse, a first set/reset pulse and a first shift register clock pulse;
a first shift register section for entering a set state based on the first set/reset pulse, and shifting first output signals when the first shift register clock pulse occurs; and
a first flip-flop section for entering a set state based on the first set/reset pulse, and receiving the first flip-flop input pulse and sequentially enabling the pull-up switching control signals when the first flip-flop clock pulse occurs and simultaneously the first output signals are sequentially inputted.

21. The semiconductor memory device as claimed in claim 19, wherein the pull-down switching controller comprises:
a second pulse generator for receiving the test signal and generating a second flip-flop input pulse, a second flip-flop clock pulse, a second set/reset pulse and a second shift register clock pulse;
a second shift register section for entering a set state based on the second set/reset pulse, and shifting second output signals when the second shift register clock pulse occurs; and
a second flip-flop section for entering a reset state based on the second set/reset pulse, and receiving the second flip-flop input pulse and sequentially enabling the pull-down switching control signals when the second flip-flop clock pulse occurs and simultaneously the second output signals are sequentially inputted.

22. The semiconductor memory device as claimed in claim 18, wherein the clock tree unit comprises:
a plurality of switching means for performing switching operations according to the switching control signals;
a plurality of pull-up means for pulling up an electric potential of an input clock according to a state of the switching means; and
a plurality of pull-down means for pulling down an electric potential of the input clock according the state of the switching means.

23. A duty cycle correction method in a semiconductor memory device comprising a delay-locked loop (DLL) for providing a delay-locked loop (DLL) clock; and a clock tree circuit for inputting the DLL clock or a reference clock as an input clock, adjusting a duty cycle of the input clock and outputting the adjusted input clock as an output clock, the duty cycle correction method comprising:
generating the reference clock such that the reference clock has a constant duty cycle; and
in the clock tree unit, adjusting a duty cycle of the reference clock by an adjustment ratio set such that the reference clock output by the clock tree unit has the constant duty cycle
in the clock tree unit adjusting a duty cycle of the DLL clock by applying the adjustment ratio to the DLL clock; and
in the DILL, when the DLL clock output by the clock tree circuit does not have the constant duty cycle,
correcting the duty cycle of the DLL clock.

* * * * *